United States Patent
Rosenfeld et al.

(10) Patent No.: US 7,648,235 B1
(45) Date of Patent: Jan. 19, 2010

(54) SPECTACLE ASSEMBLY FOR FACES WITHOUT A PROMINENT UPPER NASAL SUPPORT

(76) Inventors: Philip J. Rosenfeld, 201 Crandon Blvd., #437, Key Biscayne, FL (US) 33149; Angel J. Perez, 18101 Collins Ave., #1002, Sunny Isles, FL (US) 33160

( * ) Notice: Subject to any disclaimer, the term of this patent is extended or adjusted under 35 U.S.C. 154(b) by 0 days.

(21) Appl. No.: 12/231,775

(22) Filed: Sep. 5, 2008

(51) Int. Cl.
*G02C 5/12* (2006.01)
*G02C 5/02* (2006.01)

(52) U.S. Cl. .................. 351/131; 351/132; 351/136; 351/138

(58) Field of Classification Search ............... 351/136, 351/137, 138, 139, 80, 78, 131, 132
See application file for complete search history.

(56) References Cited

U.S. PATENT DOCUMENTS

| | | | |
|---|---|---|---|
| 1,946,233 A | 2/1934 | Page | |
| 2,298,832 A | 10/1942 | Mowrer | |
| 2,370,843 A | 3/1945 | Croninger | |
| 2,410,584 A | 11/1946 | Jencks | |
| 3,043,191 A * | 7/1962 | Lanski | 351/177 |
| 4,045,137 A | 8/1977 | Bradley, Jr. | |
| 4,252,422 A | 2/1981 | Speckhart | |
| 4,470,674 A | 9/1984 | Piampiano | |
| 4,802,753 A | 2/1989 | Lhospice | |
| 5,159,359 A | 10/1992 | Pauly et al. | |
| 5,694,194 A | 12/1997 | Morrison | |

* cited by examiner

*Primary Examiner*—Hung X Dang
(74) *Attorney, Agent, or Firm*—Cozen O'Connor

(57) ABSTRACT

A spectacle assembly structured for use by individuals of different facial characteristics comprising a pair of lenses and a nose-bridge extending between the lens pair in interconnecting relation thereto. A nose pad assembly is connected to the nose-bridge and extends rearwardly thereof in supported engagement with a prominent nasal support on an individual's nose, wherein the location of the prominent nasal support is determined by the facial characteristics of the individual. The nose-bridge and the nose pad assembly are disposed in an operative position relative to the optical centers of the lens pair so as to facilitate substantial alignment between the optical centers and the pupils of the individual's eyes, when the nose pad assembly engages the prominent nasal support.

19 Claims, 12 Drawing Sheets

Appropriate spectacle fit for a face with a flattened nasal root requires repositioning of nose-bridge:

SPECTACLE ASSEMBLY FOR FACES WITHOUT A PROMINENT UPPER NASAL SUPPORT

BACKGROUND OF THE INVENTION

1. Field of the Invention

This invention relates to a spectacle assembly for use by individuals having a substantially flattened or less than prominent upper nasal area located substantially at the junction of the upper portion of the nose and the forehead, to the extent that this upper nasal area is inadequate to reliably and consistently support conventionally constructed spectacles. Accordingly, the spectacle assembly of the present invention includes a nose-bridge disposed in a predetermined operative position relative to the optical centers of the lenses so as to engage a sufficiently prominent nasal support located along the length of a wearer's nose in spaced relation to the substantially flattened upper nasal area. The optical centers are thereby aligned with the visual axes and pupils of the wearer.

2. Description of the Related Art

The use of spectacles to improve an individual's eyesight is ubiquitous throughout the world. Even though most of the world's population lacks typical Western European facial characteristics, which includes an upper prominent nasal area between the eyes to support the spectacles' nose-bridge, most of the world's population has tolerated Western spectacles which do not necessarily fit their faces. As conventionally designed and structured, spectacles generally include a nose-bridge which is disposed between two lenses. The lenses are positioned in front of the individual's eyes in a manner which is intended to align the visual axes of the eyes with the optical centers of the lenses. For optimal fit and stability, spectacles commonly rely on a nose-bridge that is supported by the part of the nose known as the upper nasal prominence or nasal root.

Currently, conventional spectacles are designed to align the nose-bridge with the upper nasal prominence where the upper portion of the nose meets the forehead. However, conventional spectacles are typically designed for the facial characteristics of an individual of Western European descent. Whether a pair of spectacles fits an individual's face is typically determined by a trial and error process in an optical dispensary. During this process, an individual will try on different spectacles and determine if the style is appropriate for their face. A proper fit is assessed by having the optical center of the lenses aligned with the center of each pupil, which can also be referred to as the central visual axis of each eye. The appropriate fit of the spectacles to the nose is determined by the nose-bridge resting and being supported by an upper nasal prominence or nasal root of the nose with additional stabilization coming from the stems and nose pads arising from the nose-bridge with the nose pads resting on either side of the nose. This type of fit permits three-point stabilization.

However, in individuals with a less prominent or flattened nasal root, as commonly found among infants, children, and individuals of Eastern (Asian) and African ancestry, the conventionally constructed spectacle often results in a nose-bridge that is elevated off the nasal root with the only stability coming from the nose pads arising from the nose-bridge on either side of the nose. Moreover, the nose pads often rest at an angle and are almost never in full contact with the skin on the side of the nose. This is an unstable situation and often results in slippage of the spectacles until the nose-bridge comes to rest on a lower portion of the nose that is more prominent. This slippage results in a loss of alignment between the optical center of the lenses and the eyes' visual axes. Also, the appearance is not cosmetically appealing in that the spectacles do not properly fit the contour of the individual's face.

Conventional spectacles, constructed in the manner described above, are generally satisfactory for individuals of "Western European" decent or Caucasian ethnicity, that is, individuals with an elevated area along the upper portion of their noses. The shape and dimension of this type of nose includes a nasal root that can adequately support the nose-bridge of a conventionally constructed pair of spectacles. By way of example, an individual representing the aforementioned typical Western facial characteristics is shown in the prior art representation of FIG. 1. More specifically, the conventional spectacles on the represented individual include a nose bridge resting on the individual's upper nasal prominence or nasal root with two lenses attached to the nose-bridge and centered on the eyes so that the spectacles "fit the face". Moreover, the conventional spectacles, as represented on this individual, demonstrate an alignment between the optical centers of the lenses and the visual axes of each eye as represented by the center of the pupils. Other features associated with a correctly fitting pair of conventional spectacles include correct temple positioning as well as the correct dimensions of the lenses in relation to the face and the eyes of the individual.

Figure 1:
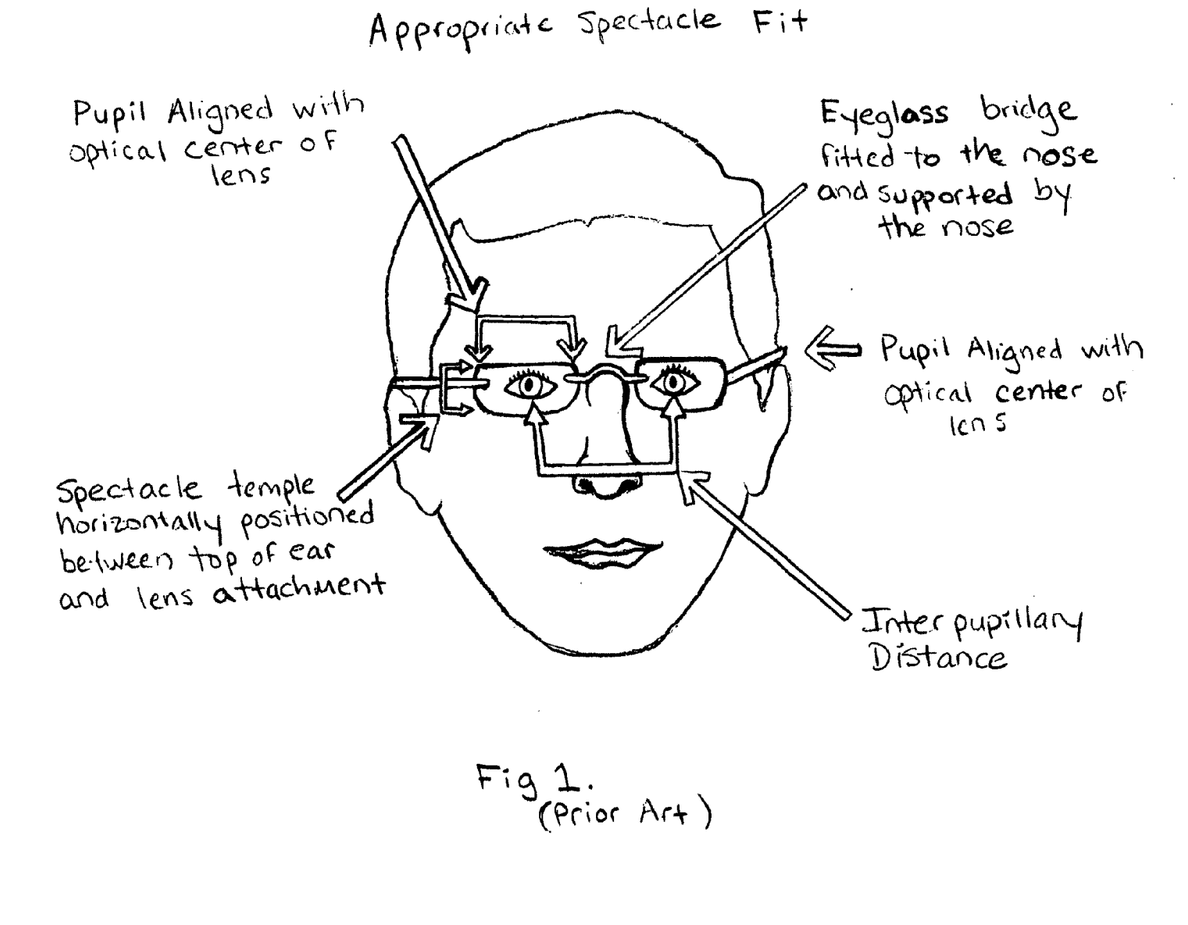
FIG. 1 is a front view of an individual wearing conventionally structured spectacles, wherein the represented individual has Western facial characteristics.
Figure 2A:
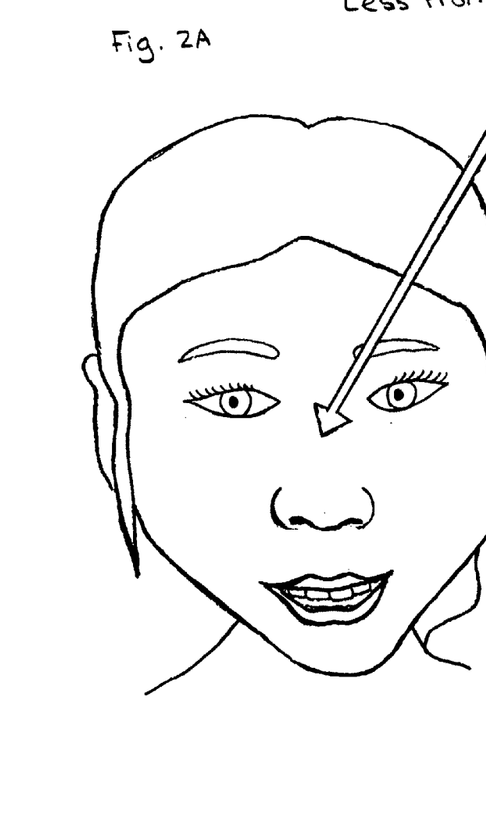
FIGS. 2A and 2B are front and side views respectively of an individual having different facial characteristics than the individual of FIG. 1, wherein schematic representations and descriptive text associated therewith further indicate the absence of a sufficient nasal support for conventional spectacles at or adjacent the upper end of the individual's nose and substantially at the junction of the upper end and the forehead.
Figure 2B:
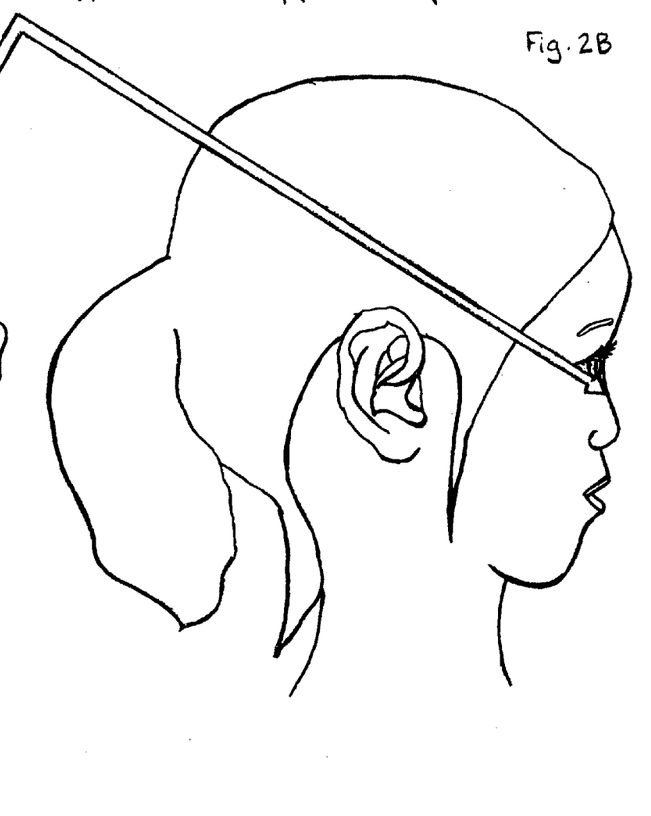

However, most individuals throughout the world do not have the demonstrated "Western" facial characteristics of the individual as represented in FIG. 1. In addition, as represented in FIGS. 2A and 2B, many, if not most, infants, toddlers, and children do not have a prominent nasal root, but rather, it appears flattened. Among adults of Asian and African descent, these individuals lack a sufficiently prominent nasal root capable of supporting a pair of conventional spectacles. As such, noses on almost all children and many non-Western adults will not provide adequate support for conventionally designed and constructed spectacles of the general type represented in FIG. 1. As a result, these individuals find it difficult to maintain the appropriate alignment of conventional spectacles on their faces due to slippage down the nose. The alignment between the optical centers of the lenses and the individual's visual axes is lost resulting in blurred vision and constant repositioning.

Figure 3A:
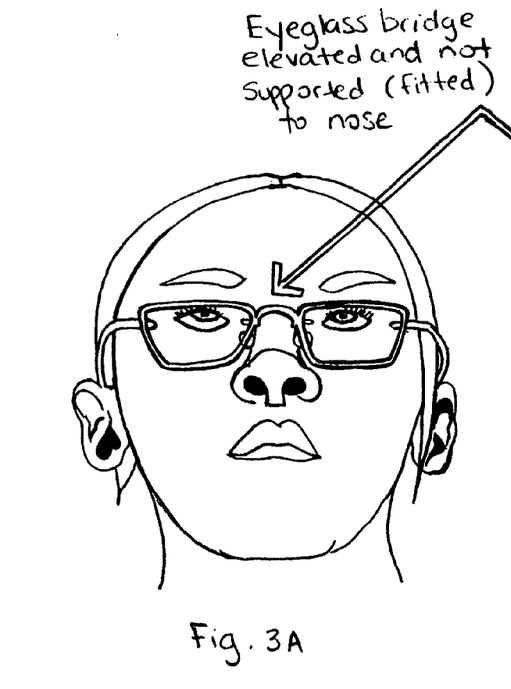
FIGS. 3A, 3B and 3C comprise a front view; a front, lower perspective view and a side view, respectively of an individual absent a sufficient nasal support at the bridge of the individual's nose and wearing conventional spectacles and further including schematic representations and descriptive text emphasizing problems and disadvantages recognized in the prior art.
Figure 3B:
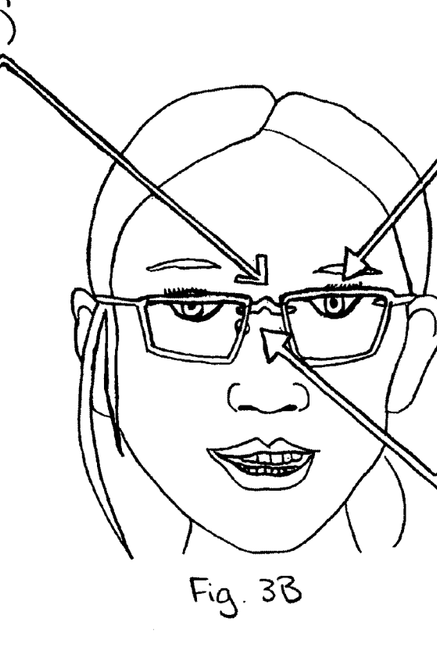
Figure 3C:
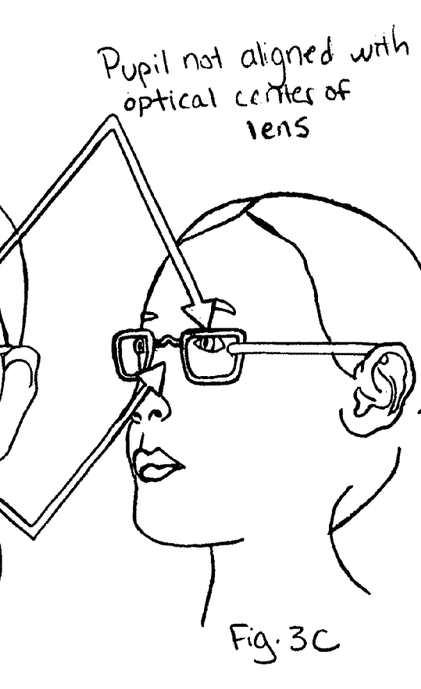

Further by way of example, FIGS. 3A, 3B and 3C show a conventional pair of "Western" spectacles being worn by a young individual not having an upper nasal prominence capable of supporting a conventional nose-bridge. Therefore, when conventionally structured spectacles are worn by such an individual, it is evident that the nose-bridge rises above and/or outwardly from the nasal root. Accordingly the nose-bridge itself is not directly engaged or supported by the nose. The conventional spectacles are held in position only by the nose pads at the end of the stems arising from the nose-bridge as represented in these Figures. Often times, to minimize slippage, the stems arising from the nose-bridge have to be squeezed together to accentuate the tightness of the nose pads to the nose. This frequently causes discomfort and indentation marks on the skin evident once the spectacles are removed. Due to the conventional positioning of the nose-bridge, the optical centers of this individual's lenses are not aligned in relation to the center of the corresponding pupils. The visual axes are in the upper portion of the lenses while the optical centers of the lenses are below the pupils. Therefore, in this common example, it is apparent that conventionally designed and structured spectacles, which include a fixed nose-bridge that needs to be supported by the wearer's nose, are not designed to be worn by children or infants with a flattened upper nasal prominence or nasal root and by most individuals of non-Western descent.

Accordingly, there is a need for a new and improved spectacle design and construction that can be worn by individuals with non-Western facial characteristics. Such a preferred and proposed pair of spectacles would minimize slippage and improve the alignment of the optical center of each lens with the corresponding visual axis of each eye. Moreover, such a proposed spectacle assembly, in order to overcome many of the above noted disadvantages and problems, should include a properly positioned nose-bridge interconnecting the two lenses and positioned on the portion of the nose that could provide adequate support while disposing the lenses sufficiently forward so as not to interfere with the eyelashes of the wearer. In addition, the nose-bridge should be attached at an appropriate position on the lenses so that the optical centers of each lens is aligned and maintained with the center of the corresponding pupil and the visual axis of each eye.

Moreover, the problems and disadvantages of conventional eyewear design would be substantially overcome by locating the nose-bridge of the proposed spectacles on a lower portion of the nose and attaching the nose-bridge to the corresponding lower portion of the lenses. Moreover, the improved nose-bridge should be attached from behind on the lenses or on the back side thereof, rather than the front side of the lenses as is common in conventional "Western" style spectacles, of the type represented in FIG. 3 A-C. By attaching the nose-bridge assembly to the back of the lenses, the nose pad assembly could be extended laterally and engage the skin on either side of the nose without interfering with the lenses. Therefore, the spectacle assembly would be fully supported by the nose-bridge resting on the nose and the nose pads would be fully aligned with and resting on the skin on either side of the nose so that a three-point stabilization would be possible. A slippage of the spectacles down the nose would thereby be eliminated or significantly restricted.

Therefore, the disposition and structuring of the nose-bridge and nose pad assembly of these improved spectacles will effectively accommodate the different facial characteristics of many individuals and different lens shapes, while maintaining the correct optical positioning of the spectacles in relation to the eyes.

SUMMARY OF THE INVENTION

The present invention is directed to a spectacle assembly of the type which may be comfortably and effectively worn by individuals having different facial characteristics such as, but not limited to, individuals having a less prominent upper nasal support. More specifically, many individuals of different ethnic backgrounds may not have a sufficiently prominent area at the upper end of their noses to effectively support and/or maintain spectacles in their intended alignment with the visual axes of the wearer. By way of example only, individuals of Eastern Asian decent frequently do not have a sufficiently prominent upper nasal support which is adequate to support and maintain a pair of conventional spectacles at their desired position to optimize vision. The resulting misalignment of the optical centers of the lenses with the visual axes of the eyes causes blurred vision. Accordingly, the spectacle assembly of the present invention is structured to accommodate individuals having a less prominent upper nasal support or nasal root.

Therefore, for purposes of describing the various preferred embodiments of the spectacle assembly of the present invention, the term "prominent nasal support" will be used to describe the location along the length of an individual's nose that is sufficient to adequately engage and effectively support the nose bridge and/or the nose pad assembly of the spectacles. Such effective support will assure substantial alignment of the optical centers of the lenses of the spectacles with the pupils or visual axes of the individual's eyes. Further, by way of example and for purposes of clarity, an individual of Western or Caucasian descent may commonly have a sufficiently prominent nasal root located substantially at the junction between an upper end of an individual's nose and the forehead, as briefly described above. As such, conventionally structured spectacles have a nose-bridge attached at an upper portion of the lenses, wherein a preferred, three-point stabilization of the spectacles on an individual is possible only when the nose-bridge and the two nose-pads are disposed to engage and be supported on the prominent nasal root at the junction of the upper nose and forehead. In contrast, individuals of many other ethnic backgrounds commonly have less prominent nasal roots at the junction between upper nose and forehead. As a result, the nose-bridge of conventional spectacles is not adequately supported at this junction. The stability of these conventional spectacles is thereby diminished and frequent slippage of the spectacles results is repetitive optical misalignment.

Therefore, the spectacle assembly of the present invention includes a pair of lens and a nose-bridge disposed between and in interconnecting relation to the lens pair. In addition, a nose pad assembly, including a pair of nose pads, may be considered a part of the nose-bridge or otherwise be appropriately connected to the nose-bridge of the spectacles, wherein both the nose-bridge and the nose pad assembly are disposed in a predetermined operative position. As described in greater detail hereinafter, such predetermined operative positioning facilitates disposition and supported engagement of the nose-bridge and nose pad assembly on a "prominent nasal support" of an individual which is spaced from the nasal root or upper nasal portion of the individual's nose, at the junction thereof with the forehead, as set forth above. Moreover, the predetermined operative position of the nose-bridge and the nose pad assembly on or relative to the prominent nasal support depends on the facial characteristics of the individual and will result in the intended alignment of the optical centers of the lenses with the visual axes of the eyes and optimal vision will be achieved.

In the various preferred embodiments of the spectacle assembly of the present invention, the operative position of the nose-bridge and the nose pad assembly will be located between the optical centers and a lower periphery of the lens pair of the spectacle assembly, depending on the location of the "prominent nasal support" of the wearer. At least some of the preferred embodiments further define the predetermined operative position of the nose-bridge and nose pad assembly to be beneath or lower than the optical centers and toward the lower peripheries of the lens pair of the spectacle assembly. In such preferred locations of the predetermined operative position, the nose-bridge and/or the nose pad assembly will be disposed to engage and be supported along the length of the nose by the "prominent nasal support" of the individual, which may be located below and in spaced relation from the typical nasal root or upper end of the nose at the junction with the forehead of the individual.

Other structural features associated with the various preferred embodiments of the spectacle assembly of the present invention include the nose-bridge of the spectacles comprising an elongated base having the opposite ends thereof connected to the rear surface portions of each of the spaced apart lenses of the lens pair. In addition the nose pad assembly is connected to the nose-bridge and includes a pad support or pad stem also having a generally elongated configuration connected to an intermediate portion of the base of the nose-bridge. Moreover, each end of the elongated pad stem is structured to removably and/or fixedly secure a nose pad thereto.

Moreover, the nose-bridge and nose pad assembly will be attached on the back-side of the lenses to permit full contact of the nose-pads with the skin on either side of the nose. This will provide additional stabilization to the spectacle assembly. Further, the nose pad assembly, which is connected to the nose-bridge, may include a hook-like component or other connecting structure that permits the insertion of an exchangeable nose pad. As such, the two nose pads extend laterally and rearward of the nose-bridge and rearward of the lens pair and towards the face of the individual. The relative structuring and positioning of the nose pad assembly, specifically including the two nose pads, and the nose-bridge of the spectacle assembly allows for a wide variance in the dimension and configuration of the lenses defining the lens pair, as well as the spacing there between. As such, the design and structuring of the various embodiments of the spectacles of the present invention are capable of being effectively adapted to accommodate the overall dimension and shape of any individual's face, eyes, nose, etc.

Therefore, the structural and operative versatility of the various components of the spectacle assembly of the present invention, including one or more preferred embodiments thereof, facilitate considerable variance in the size, configuration and overall design features of the lens pair, the nose-bridge, nose pad assembly and temples associated therewith. However, a common feature in the versatile structuring and design of the various embodiments of the spectacle assembly of the present invention is the ability to accurately position and maintain the lens pair and more specifically the optical centers thereof in aligned relation with the visual axis or pupils of the eyes of the individual. This intended and correct optical positioning is accomplished even when the facial characteristics of the individual is such that the prominent nasal support sufficient to support the spectacles, is disposed along the length of the individual's nose and spaced from the upper end of the individuals' nose at the junction thereof with the forehead. Accordingly, the spectacle assembly of the present invention comprises a true universal design that can fit many individuals, of various ages, having different facial characteristics.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to a spectacle assembly structured for use by individuals of different facial characteristics such as, but not limited to, individual's having an insufficient nasal support for conventional spectacles at or adjacent to a junction of the upper end of the individual's nose and the individual's forehead.

Figure 4A:
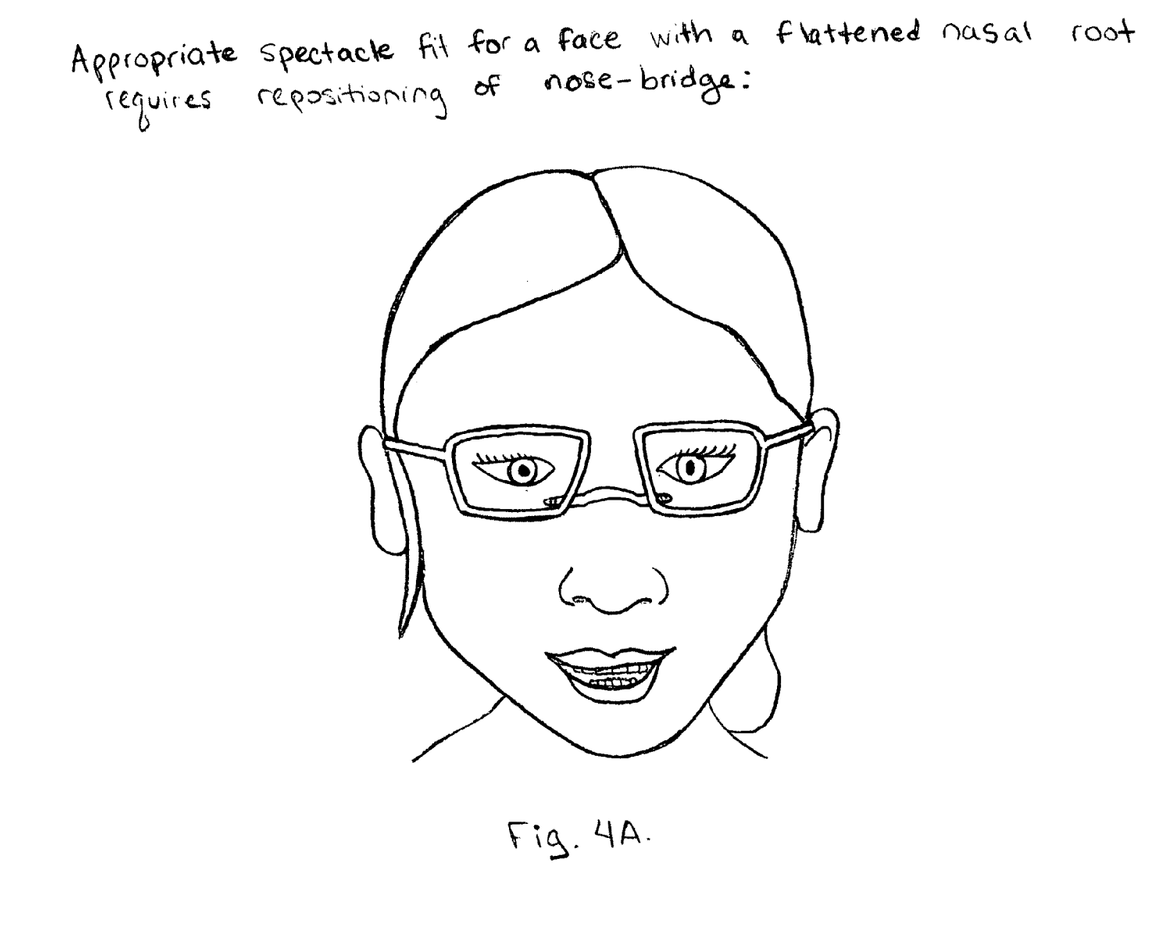
FIGS. 4A and 4B are front views in partial schematic form with descriptive text indicating proper structuring, design and location of the improved eyeglass assembly of the present invention.
Figure 4B:
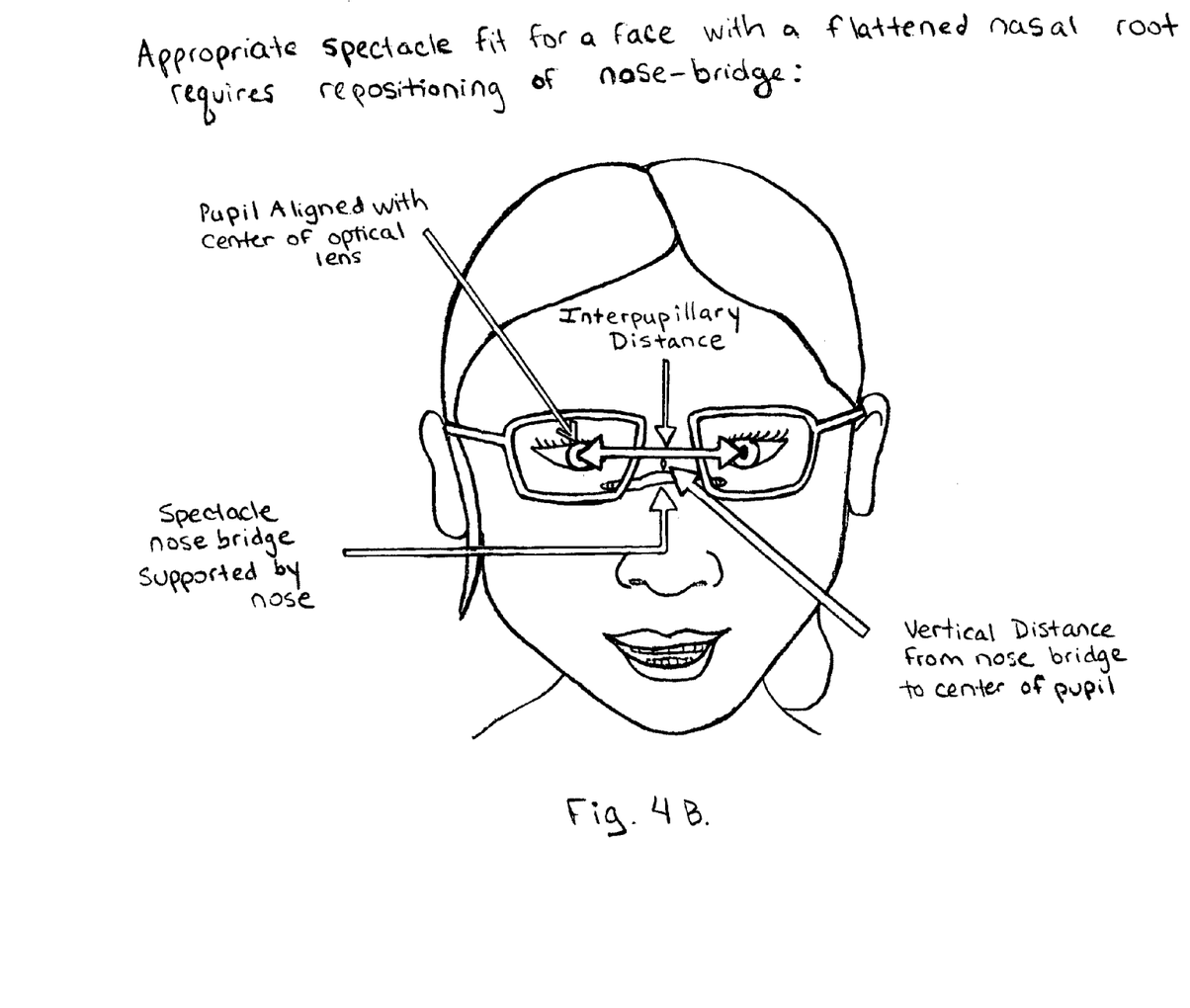
Figure 4C:
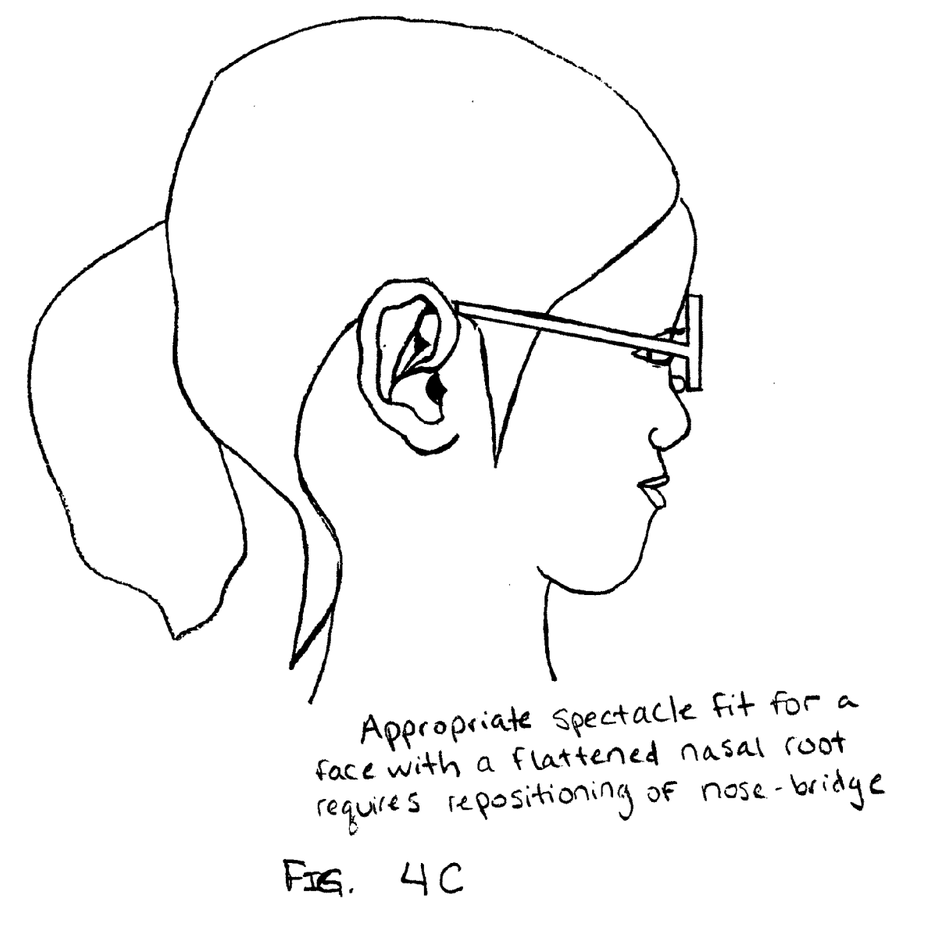
FIGS. 4c and 4D are side views of the embodiment of FIGS. 4A and 4B with additional schematic representations and descriptive text.
Figure 4D:
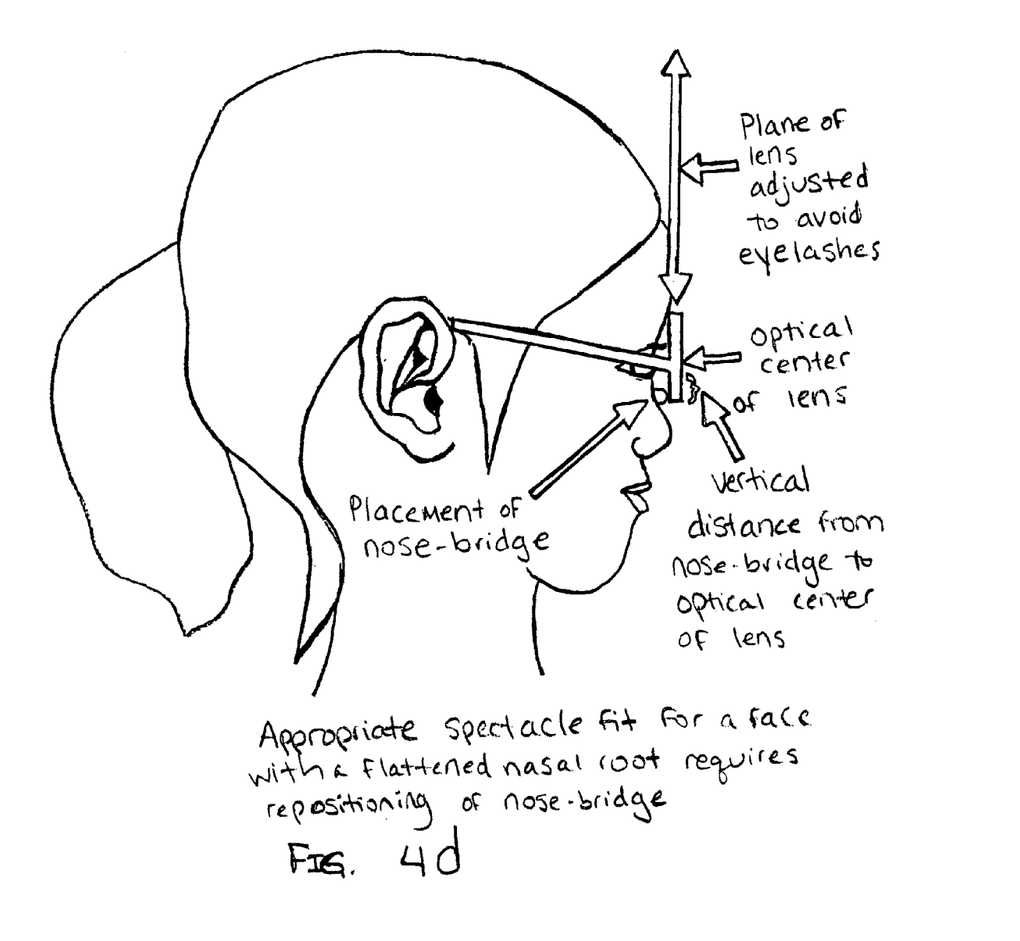

As represented in the accompanying drawings and with primary reference to FIGS. 4A through 4D, a schematic presentation of at least one embodiment of the spectacle assembly of the present invention is presented along with descriptive text in a superimposed relation to the face and eyes of a wearing individual. Certain dimensions and structural features are represented by the descriptive text that may assist in the assembly of the spectacle of the present invention and the fitting thereof to the face of an individual having an insufficient upper nasal support area to accommodate conventionally structured spectacles, of the type described in the prior art representation of FIG. 1. Accordingly, pertinent features include the interpupillary distance, the vertical distance between the visual axes and the position of the nose-bridge of the spectacles on the nose, and the width or length of the nose-bridge. FIGS. 4C and 4D are side views of FIGS. 4A and 4B with the placement of the nose-bridge on the nose at an appropriate "prominent nasal support" position so that the nose can support the nose-bridge and at a position so that the plane of the lenses is moved far enough away from the eyes so as to not interfere with the eyelashes. This view also allows for placement of the temples from the top of the ears to their point of interconnection with the lenses.

Figure 5:
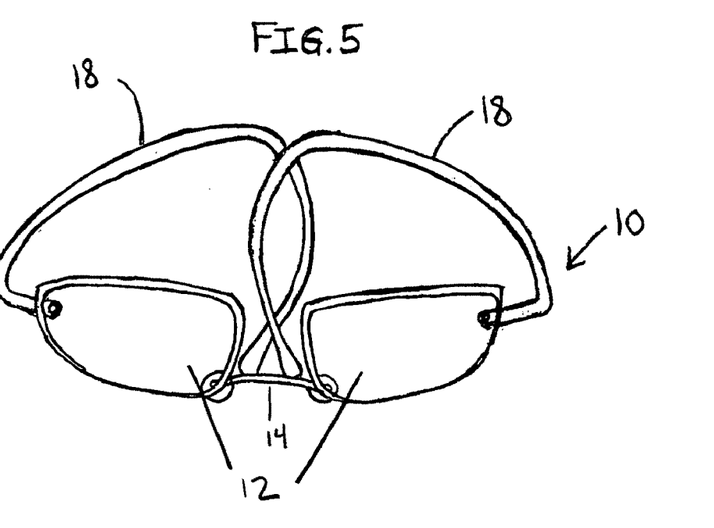
FIG. 5 is a front perspective view of at least one preferred embodiment of the eyeglass assembly of the present invention.
Figure 6:
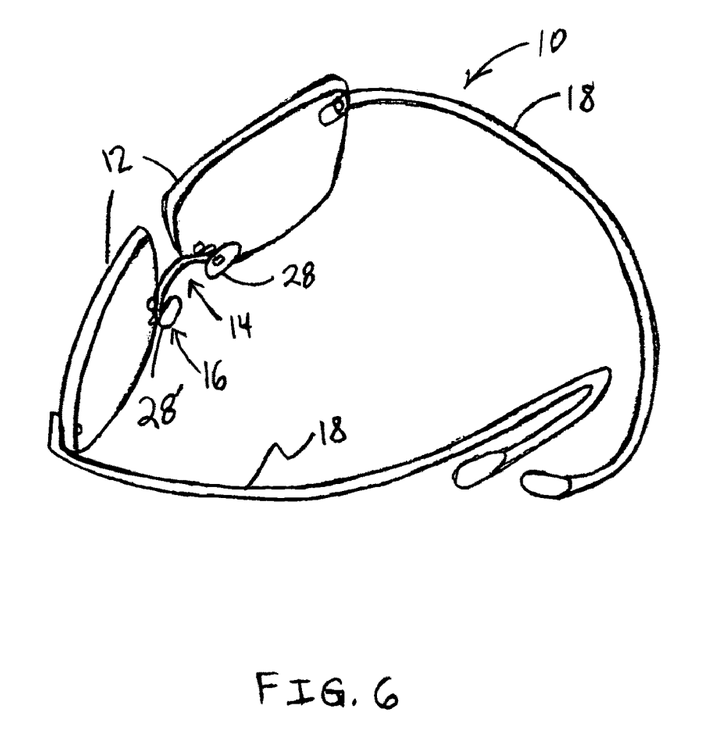
FIG. 6 is a top perspective view of the eyeglass assembly of the embodiment of FIG. 5.
Figure 7:
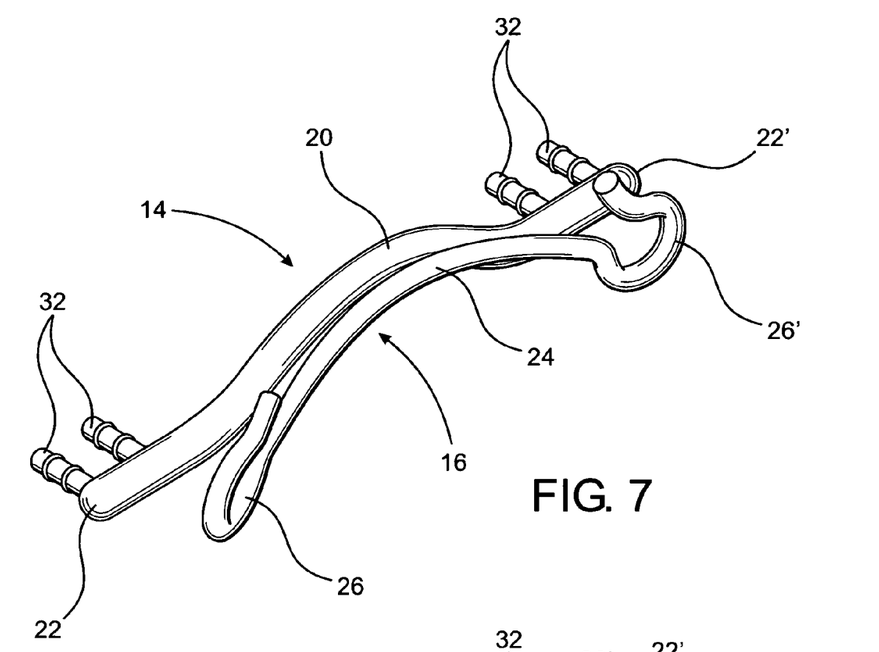
FIG. 7 is a perspective view of a nose-bridge assembly and nose pad assembly associated with the embodiments of FIGS. 4-6 in an at least partially assembled form.
Figure 8:
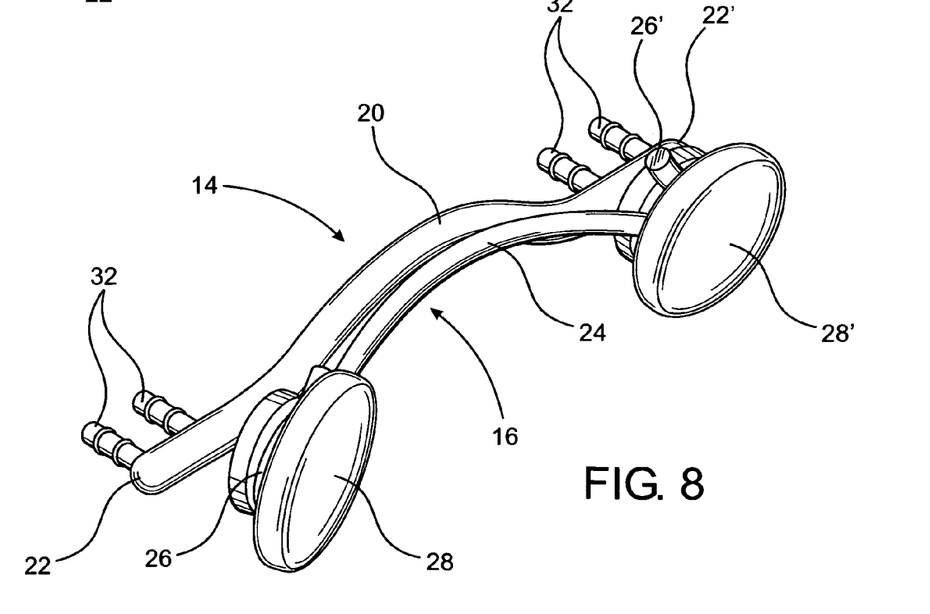
FIG. 8 is a perspective view of the embodiment of FIG. 7 in an assembled form.
Figure 9:
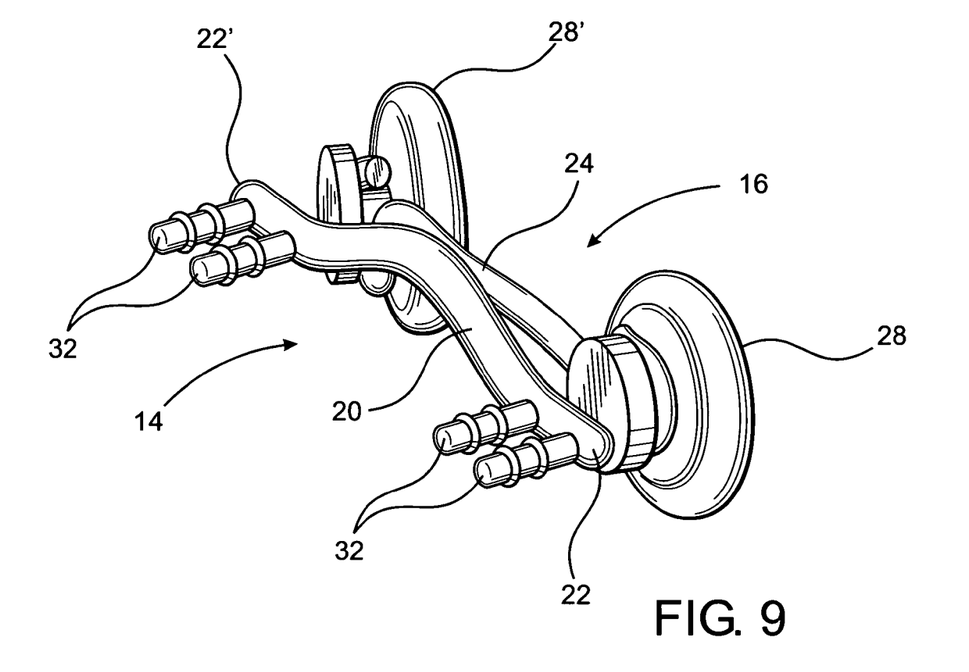
FIG. 9 is a rear perspective view of the embodiment of FIG. 8.
Figure 10:
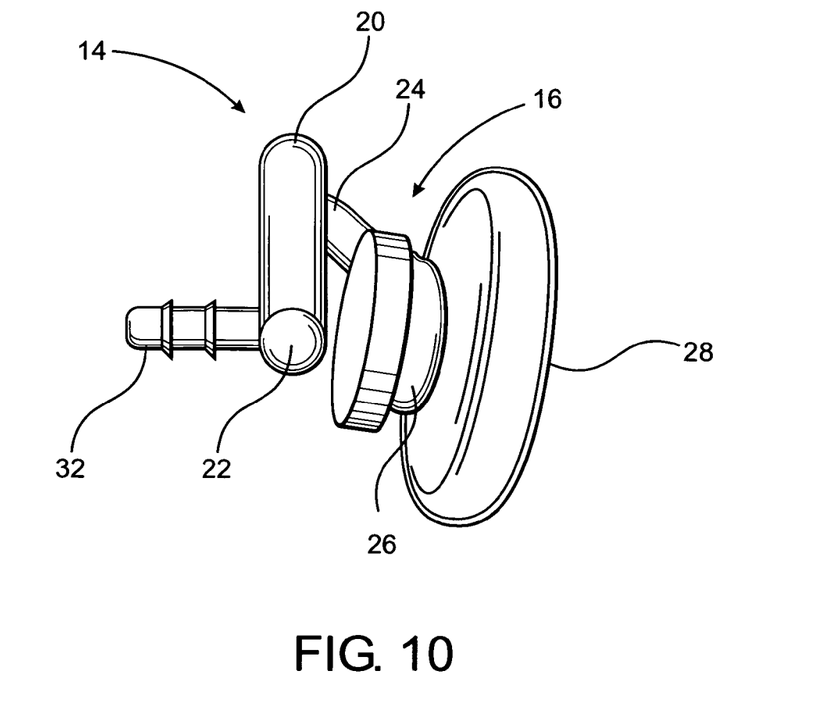
FIG. 10 is a side view of the embodiment of FIGS. 8 and 9.

With concurrent reference to FIGS. 5 and 6, the spectacle assembly 10 of the present invention includes a lens pair 12 wherein each lens is disposed in overlying relation to a corresponding eye of the individual. Under ideal conditions, the dimension, configuration and overall structure of the lens pair 12 as well as the additional components of the spectacle assembly 10 serve to align the optical centers of the lens pair with the pupils and/or visual axis of the individual. Accordingly, the inter-pupillary distance corresponds to the location of the optical centers of the lens pair 12 which in turn is at least partially dependent on the position, shape and dimension of the lens pair 12. Also, the lens width and the bridge width or length are cooperatively dimensioned to correspond the optical centers of the lens pair 12 to the correct interpupillary distance, in light of the total width of the spectacles, as determined between the outer ends of the lens pair 12. Therefore, a nose-bridge 14 and an accompanying nose pad assembly 16, to be described in greater detail hereinafter, is disposed in a predetermined operative position relative to the lens pair 12 and more specifically relative to the optical centers thereof. As such the nose-bridge 14 and/or nose pad assembly 16 engages the nose of the individual at a sufficiently prominent nasal support area to support the spectacle assembly 10 by supporting engagement with the nose-bridge 14 and nose pad assembly 16. As set forth above, this "prominent nasal support" defines a portion of the wearer's nose disposed along the length thereof that is sufficiently prominent or otherwise configured, relative to the individual's face, to engage and consistently support the nose pad assembly 16 and/or nose-bridge 14. The prominent nasal support is thereby sufficiently prominent to support the spectacle assembly in a manner which assures substantial alignment between the optical centers of the individual lenses of the lens pair 12 and the pupils or visual axes of the individual.

More specific reference is made to FIGS. 5 and 6, while taking into consideration the schematic representations of the preferred embodiments of the spectacle assembly 10 as represented in FIGS. 4A through 4D. Accordingly, the spectacle assembly 10 includes the lens pair 12 and the nose-bridge generally indicated as 14. The nose pad assembly 16 is connected to the nose-bridge 14 as will be explained in greater detail with reference to FIGS. 7-10. In addition, at least one embodiment of the spectacle assembly 10 may also include temple members 18 each having one end secured to an outer portion of a different one of the lenses of the lens pair 12. Each of the temples 18 include a generally elongated configuration and may have the distal ends thereof specifically shaped to engage the ears or other portions of the individual's head. When provided, the temples 18 further facilitate maintenance of the spectacle assembly 10 in the preferred, accurate position, which is again primarily determined by substantial alignment between the optical centers of the lens pair 12 and the pupils or visual axes of the individual, as represented in FIGS. 4A through 4D.

With primary reference to FIGS. 7-10, structural and operative features of the nose-bridge 14 and the nose pad assembly 16 are represented in detail. More specifically, the nose-bridge 14 includes an elongated base 20 and two oppositely disposed ends 22 and 22'. Further, the nose pad assembly 16 includes an elongated central portion or pad support 24 having its opposite ends 26 and 26' structured to support and be connected to nose pads 28 and 28', respectively. As such, the nose pad support 24 of the nose pad assembly 16 is connected intermediate the opposite ends 22 and 22' of the base 20 of the nose-bridge 14. In addition, the opposite ends 26 and 26' and the nose pads 28 and 28' are spaced from the corresponding portions of the base 20 including the corresponding ends 22 and 22'. Accordingly, the connected nose pads 28 and 28' are disposed behind the corresponding ends 22 and 22' and towards the face of the wearer. Each of the ends 26 and 26' of the pad support 24 is configured to define a mounting member for the fixed or removable connection of corresponding ones of the nose pads 28 and 28' to the pad support 24. As clearly represented in FIGS. 7-10 and additionally evident in the embodiments of FIGS. 11 through 14, the opposite ends 22 and 22' of the base 20 of the nose-bridge 14 include outwardly projecting connecting members or fingers 32 which are structured and disposed to fixedly attach the opposite ends 22 and 22' to a rear surface or rear portion of corresponding ones of the two lenses of the lens pair 12.

In establishing an interconnection of the base 20 of the nose-bridge 14 to the rear surfaces or corresponding rear portions of the lens pair 12, the nose pad assembly 16 extends further rearwardly from the base 20, towards the face of the individual on which the spectacle assembly 10 is mounted. Therefore, each of the nose pads 28 and 28' are disposed rearwardly of the base 20 in non-engaging, unattached relation to either of the lenses of the lens pair 12. This facilitates the positioning of the nose pads 28 and 28' on either side of the nose and behind a corresponding one of the lenses of the lens pair 12, no matter where the nose-bridge 14 is positioned when adequately supported on an appropriate prominent nasal support on the nose of the individual. Also, the size, configuration and disposition of the lens pair 12 and the spacing between the lenses defining the lens pair 12 can be made to physically and aesthetically adapt to the overall physical characteristics of the face of the individual and to the location and dimension of the prominent nasal support on which the nose pads 28 and 28' are supported and engage. In turn, an almost infinite variety of shapes and sizes of lens pairs 12 may be utilized to better serve the needs and desires of the individual thereby adding aesthetic versatility and decorative variance to the various embodiments of the spectacle assembly 10 of the present invention.

As set forth above and as clearly demonstrated in FIGS. 11-15, the latter Figure being a prior art representation of an individual wearing conventional spectacles, one feature of the present invention is the accurate placement and maintenance of the spectacle assembly 10 on an individual having a less than prominent or adequate upper nasal root located at the junction of the nose with the forehead. Therefore, the nose-bridge 14 of the spectacle assembly 10 and the connected nose pad assembly 16 are connected to the lens pair 12 in a predetermined operative position based on the facial dimensions and/or characteristics of the wearer. This predetermined operative position assures that the optical centers of the lens pair 12 are substantially aligned with the pupils or visual axes of the individual when the nose-bridge 14 and nose pad assembly 16 are disposed in engaged, supporting relation to a sufficiently prominent nasal support along the length of the nose, as represented in FIGS. 11-14.

Figure 11:
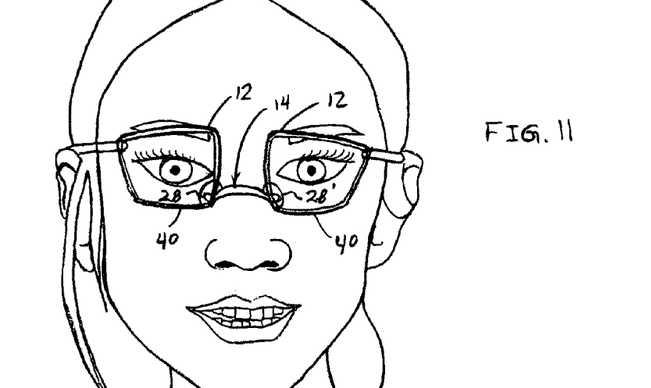
FIG. 11 is a front view of an individual absent a prominent nasal support located at the nasal root of the nose and wearing at least one preferred embodiment of the eyeglass assembly of the present invention.
Figures 12, 13:
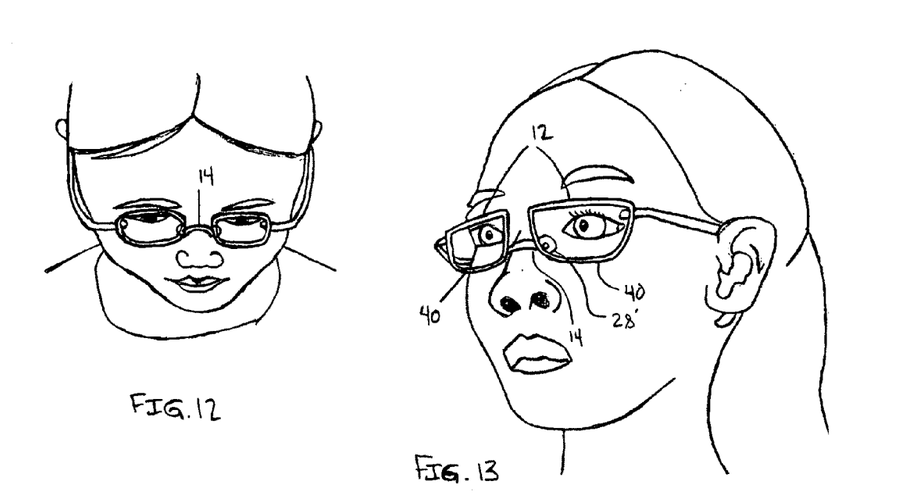
FIG. 12 is an upper perspective view of the embodiment of FIG. 11.
FIG. 13 is a side perspective view of the embodiment of FIGS. 11 and 12.
Figure 14:
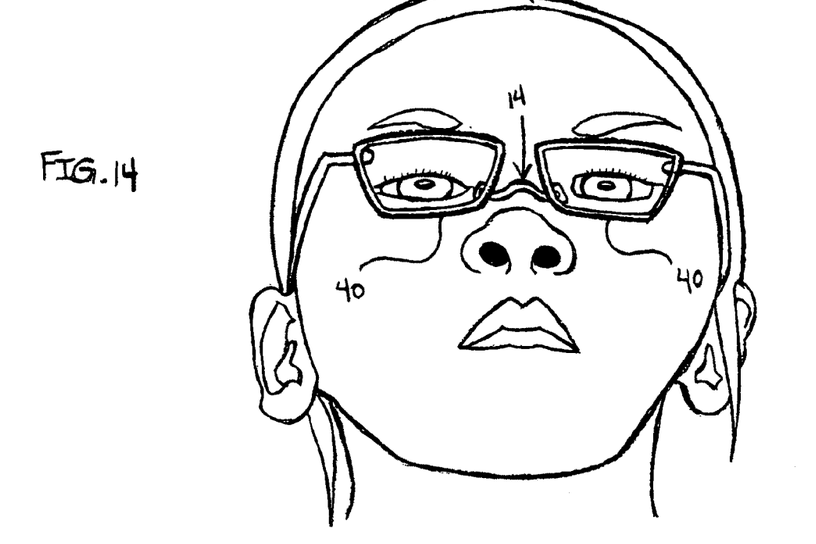
FIG. 14 is a lower perspective view of an individual absent a prominent nasal support located at the nasal root of the nose and wearing at least one preferred embodiment of the spectacle assembly of the present invention.

With specific reference to FIGS. 11-14, the nose pad assembly 16 is in its operative position relative to the optical centers of the lens pair 12 by being disposed at or between the optical centers and a lower periphery 40 of the lens pair 12. In FIG. 11, while the "optical centers" are not specifically designated by a reference numeral, it should be clearly apparent that the pupils or visual axes of the individual are substantially aligned with the center of each lens defining the lens pair 12. Therefore, in the embodiment(s) represented in FIGS. 11-14, it is apparent that the disposition of the nose-bridge 14, nose pad assembly 16 and nose pads 28 and 28' are disposed preferably beneath the optical centers of the lens pair 12 and most preferably between the optical centers and the lower periphery 40 of the lens pair 12. As also clearly represented, at least one preferred embodiment of the present invention comprises the nose-bridge 14 substantially aligned with the lower periphery 40 of the lens pair 12. The predetermined operative positioning of the nose-bridge 14 and nose pad assembly 16 are measured or otherwise determined such that the nose pad 28 and 28' will engage and be supported on opposite sides of the nose at the sufficiently prominent nasal support area of the represented individual. As again emphasized, this prominent nasal support area of the represented individual is disposed in spaced relation to the nasal root or upper nasal portion of the individual's nose. As demonstrated and described in detail above, the upper nasal portion of the represented individual's nose is absent any sufficiently prominent area which is capable of effectively supporting the nose-bridge 14 and/or nose pad assembly 16.

Figure 15:
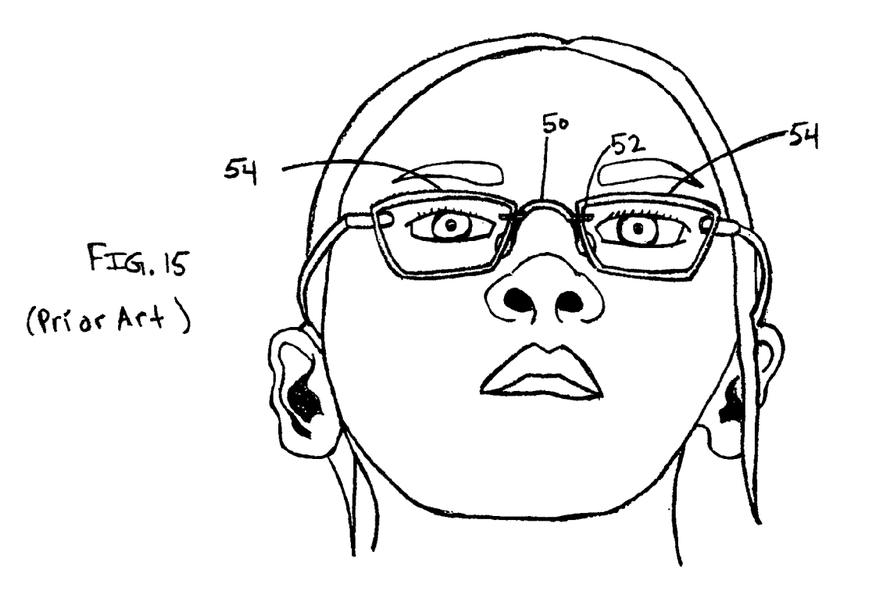
FIG. 15 is a lower perspective view of the individual represented in FIG. 14 and being absent a sufficiently prominent nasal support located at the nasal root and wearing conventional, prior art spectacles having a nose-bridge disposed and structured for support at the nasal root, where the upper end of the nose meets the forehead.

The prior art representation of FIG. 15 further demonstrates the absence of any significant upper nasal support area adjacent or in alignment with the root of the nose of the represented individual, wherein such an individual is represented as wearing conventionally structured spectacles. As such, the bridge 50 of the conventional spectacles extends upward and outward in non-supported relation on the upper nasal area of the nose of the individual. Moreover, the nose pad assembly 52 of the conventional spectacles is disposed above the optical centers of the respective lenses of the conventional spectacles, thereby facilitating misalignment between the pupils of the individual and the optical centers. Also, because of the connection and/or disposition of the nose pad assembly 52 relative to the lenses of the conventional spectacles, the nose pads cannot be extended laterally because the nose-pad assembly 52 would collide with the lenses. As a result, the nose pads of conventional spectacles typically have to be squeezed together in an effort to minimize slippage. This is uncomfortable for the individual, leaving marks on the skin around the nose, and it does not adequately prevent slippage. Accordingly, the use of the conventional spectacles by the represented individual would result in misalignment between the pupils of the individual and the optical centers of the lenses, because of poor positioning of the nose-pads along the nose and slippage of the nose-bridge 14 down the nose.

It is recognized that the precise location of the nose-bridge 14 and nose pad assembly 16 may vary when they are in the preferred operative position, dependent on the size, shape and other physical characteristics of an individual's face. Accordingly, the various preferred embodiments of the spectacle assembly 10 of the present invention overcome such physical characteristics of the individual's face by locating the predetermined operative position of the nose-bridge 14 and/or nose pad assembly 16 along the interior or nasal peripheries and between the optical centers and the lower peripheral portions 40 of the lens pair 12.

It is further emphasized the term "optical center(s)" as used herein is not necessarily describing the true geometric center of the lens or lens pair. It is recognized that the optical center of any lens may deviate from the geometrical center thereof based on a variety of factors including, but not limited to, the size, shape and placement of the lens as well as any additional optical features associated therewith, such as bifocal lenses, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A spectacle assembly structured for use by individuals having different facial characteristics, said spectacle assembly comprising:
   a pair of lenses,
   a nose-bridge extending between and in interconnecting relation to said lens pair,
   a nose pad assembly including two spaced apart nose pads connected to said nose-bridge and disposable in supported relation to a prominent nasal support on the individual's nose,
   said nose-bridge comprising a base including opposite ends each fixedly connected to a rear surface of a different one of said lens pair,
   said pad assembly including an elongated pad support connected to an intermediate portion of said base, said pad support including two free ends spaced outwardly from said base and said lens pair,
   each of said pads connected to a different one of said free ends in outwardly spaced relation to said base,
   said nose-bridge connected to said lens pair at a predetermined operative position relative to optical centers of said lens pair,
   said predetermined operative position sufficient to substantially align said optical centers with the pupils and visual axes of the individual, and
   said predetermined operative position of said nose-bridge disposed to confront the prominent nasal support in spaced relation from the nasal root and along a length of the individual's nose.

2. A spectacle assembly as recited in claim 1 wherein said predetermined operative position of said nose-bridge is disposed between said optical centers and said lower peripheries of said lens pair.

3. A spectacle assembly as recited in claim 2 wherein said predetermined operative position of said nose-bridge is at least partially dependent on an aligned, confronting engagement of said nose pad assembly with the prominent nasal support.

4. A spectacle assembly as recited in claim 1 wherein said predetermined operative position of said nose-bridge is disposed substantially at said optical centers or said lower peripheries of said lens pair.

5. A spectacle assembly as recited in claim 1 wherein said predetermined operative position of said nose-bridge is disposed beneath of said optical centers of the lens pair.

6. A spectacle assembly as recited in claim 5 wherein said nose pad assembly is disposed beneath said optical centers of said lens pair when in confronting engagement with the prominent nasal support.

7. A spectacle assembly as recited in claim 5 wherein said predetermined operative position of the nose-bridge is at least partially dependent on a configuration of said lens pair and said optical centers of said lens pair being in substantial alignment with the pupils and visual axes of the individual.

8. A spectacle assembly as recited in claim 5 wherein said predetermined operative position of said nose-bridge is disposed in substantial alignment with the lower peripheries of said lens pair.

9. A spectacle assembly as recited in claim 1 further comprising two temple pieces each interconnected to a different lens of said lens pair and disposable in supported engagement with the individual's head.

10. A spectacle assembly as recited in claim 1 wherein said nose pad assembly is disposed in non-engaging relation to said lens pair.

11. A spectacle assembly as recited in claim 1 wherein said nose pad assembly is disposed out of interruptive relation to selective lateral placement of each lens of said pair relative to one another.

12. A spectacle assembly as recited in claim 1 wherein said two spaced apart nose pads are collectively disposed in said predetermined operative position; said predetermined operative position at least partially defined by engagement of said nose pads with opposite sides of the prominent nasal support when the optical centers of said lens pair are substantially aligned with the individual's pupils and visual axes.

13. A spectacle assembly as recited in claim 12 wherein said predetermined operative position further comprises disposition of said nose pads between the optical centers and a lower periphery of said lens pair.

14. A spectacle assembly as recited in claim 12 wherein said predetermined operative position further comprises disposition of said nose pads below the optical centers of said lens pair.

15. A spectacle assembly as recited in claim 1 wherein said predetermined operative position further comprises said nose pads disposed between the optical centers and a lower periphery of said lens pair.

16. A spectacle assembly as recited in claim 1 wherein said predetermined operative position further comprises said nose pads disposed below the optical centers of said lens pair in substantial alignment with lower peripheries of said lens pair.

17. A spectacle assembly structured for use by individuals having different facial characteristics, said spectacle assembly comprising:
    a lens pair,
    a single nose-bridge disposed in interconnecting relation between said lens pair,
    a nose pad assembly including a pair of nose pads disposable in an operative position,
    said operative position at least partially defined by said nose pads disposed in engaging relation with a prominent nasal support of the individual, when the optical centers of said lens pair are substantially aligned with the individual's pupils and visual axes,
    said operative position further defined by disposition of said nose pads along a length of an individual's nose between the optical centers of said lens pair and a lower periphery of said lens pair,
    said single nose-bridge comprising a base including opposite ends each fixedly connected to a rear surface of a different one of said lens pair,
    said pad assembly including an elongated pad support connected to an intermediate portion of said base, said pad support including two free ends spaced outwardly from said base and said lens pair, and
    each of said pads connected to a different one of said free ends in outwardly spaced relation to said base.

18. A spectacle assembly as recited in claim 17 wherein said predetermined operative position further comprises disposition of said nose pads below the optical centers of said lens pair relative to lower peripheries of said lens pair.

19. A spectacle assembly as recited in claim 17 wherein said operative position is further defined by said nose-bridge disposed between said optical centers and a lower periphery of said lens pair.

\* \* \* \* \*